US011544703B2

(12) United States Patent
Cho et al.

(10) Patent No.: US 11,544,703 B2
(45) Date of Patent: Jan. 3, 2023

(54) DIGITAL WALLET FOR THE PROVISIONING AND MANAGEMENT OF TOKENS

(71) Applicant: Mastercard International Incorporated, Purchase, NY (US)

(72) Inventors: Jeehoon Joshua Cho, Dublin, OH (US); Sowmya Reddy Lakka, Wildwood, MO (US); Gerardo Cardone, Staten Island, NY (US); Matthew James Miller, Redding, CT (US); Maurice David Liscia, Long Island City, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 100 days.

(21) Appl. No.: 15/928,605

(22) Filed: Mar. 22, 2018

(65) Prior Publication Data

US 2018/0276657 A1 Sep. 27, 2018

Related U.S. Application Data

(60) Provisional application No. 62/475,554, filed on Mar. 23, 2017.

(51) Int. Cl.
*G06Q 20/36* (2012.01)
*G06Q 20/32* (2012.01)
(Continued)

(52) U.S. Cl.
CPC ....... *G06Q 20/3674* (2013.01); *G06Q 20/227* (2013.01); *G06Q 20/229* (2020.05);
(Continued)

(58) Field of Classification Search
CPC .................................... G06Q 20/3672
See application file for complete search history.

(56) References Cited

U.S. PATENT DOCUMENTS 11,210,648 B2 * 12/2021 Ortiz ................. G06Q 20/3223
2013/0110658 A1 * 5/2013 Lyman ............... G06Q 20/3674
705/41

(Continued)

FOREIGN PATENT DOCUMENTS

CN 105612543 A 5/2016
EP 2997532 A1 3/2016

(Continued)

OTHER PUBLICATIONS

Techterms.com, Internet of Things Definition, Jan. 16, 2015, p. 1 (Year: 2015).*

(Continued)

*Primary Examiner* — Hani M Kazimi
*Assistant Examiner* — Adam Hilmantel
(74) *Attorney, Agent, or Firm* — Buckley, Maschoff & Talwalkar LLC

(57) ABSTRACT

Disclosed are methods and systems for associating payment card credentials with a companion application. In an embodiment, a consumer's mobile device processor receives an instruction to launch a companion application, displays a companion application user interface, and receives selection of an option to obtain payment card credentials from at least one wallet application. The process also includes displaying a list of payment card accounts associated with the selected wallet application for association with the companion application, receiving a selection of at least one payment card account, transmitting payment account credentials of the selected payment account to a wallet server computer, receiving a companion token representing a digitization of the selected payment card account from the wallet server (Continued)

computer, and associating the companion token with the companion application.

10 Claims, 9 Drawing Sheets

(51) Int. Cl.
    *G06Q 20/22*     (2012.01)
    *G06Q 20/40*     (2012.01)

(52) U.S. Cl.
    CPC ....... *G06Q 20/327* (2013.01); *G06Q 20/3223* (2013.01); *G06Q 20/3227* (2013.01); *G06Q 20/3672* (2013.01); *G06Q 20/405* (2013.01)

(56) References Cited

U.S. PATENT DOCUMENTS

| | | |
|---|---|---|
| 2016/0232518 A1 | 8/2016 | Butler, IV |
| 2017/0068952 A1* | 3/2017 | Brockmann ....... G06Q 20/4014 |
| 2020/0082386 A1* | 3/2020 | Salama ................ G06Q 20/322 |

FOREIGN PATENT DOCUMENTS

| | | | | |
|---|---|---|---|---|
| EP | 3293686 A1 * | 3/2018 | ........... | G06Q 20/223 |
| RU | 2520410 C2 | 6/2014 | | |
| RU | 2013158683 A | 7/2015 | | |
| WO | 2012151590 A2 | 11/2012 | | |
| WO | 2016/181612 A1 | 11/2016 | | |
| WO | 2016181612 A1 | 11/2016 | | |

OTHER PUBLICATIONS

"Manjumder et al. Pay-Cloak: A Biometric Back Cover for Smartphones: Facilitating secure contactless payments and identity virtualization at low cost to end users, Apr. 2017, IEEE Consumer Electronics Magazine, vol. 6, No. 2, pp. 78-88, entire document" (Year: 2017).*
"Russian Office Action", dated Dec. 16, 2019, Russian Patent and Trademark Office, for Russian Application No. 2019133534, 3pgs.
"English-language Translation of Russian Office Action", dated Dec. 16, 2019, Russian Patent and Trademark Office, for Russian Application No. 2019133534, 2pgs.
"PCT International Search Report and Written Opinion", PCT Application No. PCT/US2018/023731, dated Jun. 11, 2018, 12 pp.
Crowe, Marianne, "Is Payment Tokenization Ready for Primetime?", dated Jun. 11, 2015, 51 pp.
"Russian Office Action", dated Jul. 31, 2020, Russian Patent and Trademark Office, for Russian Application No. 2019133534, 7 pp.
"English-language Translation of Russian Office Action", dated Jul. 31, 2020, Russian Patent and Trademark Office, for Russian Application No. 2019133534, 7 pp.
"Decision on Grant with English Translation", dated May 5, 2021, Russian Patent and Trademark Office, for Russian Application No. 2019133534, 25 pp.
"European Examination Report", dated Dec. 15, 2021, European Patent Office, for European Application No. 18716790.3, 7 pp.
Crowe, Marianne et al., "Is Payment Tokenization Ready For Prime Time? Perspectives from Industry Stateholders on the Tokenization Landscape" Jun. 11, 2015, 51 pp.
"Indian Examination Report", dated Jun. 28, 2021, Indian Intellectual Property Office, for Indian Application No. 20191704763, 7 pp.
"Chinese First Office Action", dated Oct. 8, 2022, Chinese Patent Office, for Chinese Application No. 201880029729.6, 20 pp.

* cited by examiner

DIGITAL WALLET FOR THE PROVISIONING AND MANAGEMENT OF TOKENS

CROSS-REFERENCE TO RELATED APPLICATIONS

The present application claims the benefit of U.S. Provisional Patent Application No. 62/475,554 entitled "Digital Wallet for the Provisioning and Management of Tokens" filed on Mar. 23, 2017, the entire contents of which are incorporated herein by reference.

BACKGROUND OF THE INVENTION

Payment card accounts are in widespread use. Payment cards and/or associated payment account numbers or payment tokens are frequently presented by consumers and businesses to pay for in-store purchase transactions, online shopping transactions, bill payments and other purposes.

A typical consumer may be issued a payment card account as a result of an application process. Applications for payment card accounts may be taken, for example, online (via a website hosted by the account issuer) or at a branch office (bank branch) maintained by the account issuer.

Consumers frequently associate their payment card information with different merchants (e.g., such as storing payment card information at retailers such as Amazon.com or the like) or with device based mobile wallets, or with cloud based wallets. With increasing frequency, consumers are also associating their payment card information with different devices such as "Internet of things" or "IoT" devices. For example, a consumer may associate a payment account with a device such as their automobile, or a health monitoring device. It would be desirable to provide methods and systems that allow users to manage the distribution and use of their payment card information across different devices, merchants, or the like.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

Figure 1:
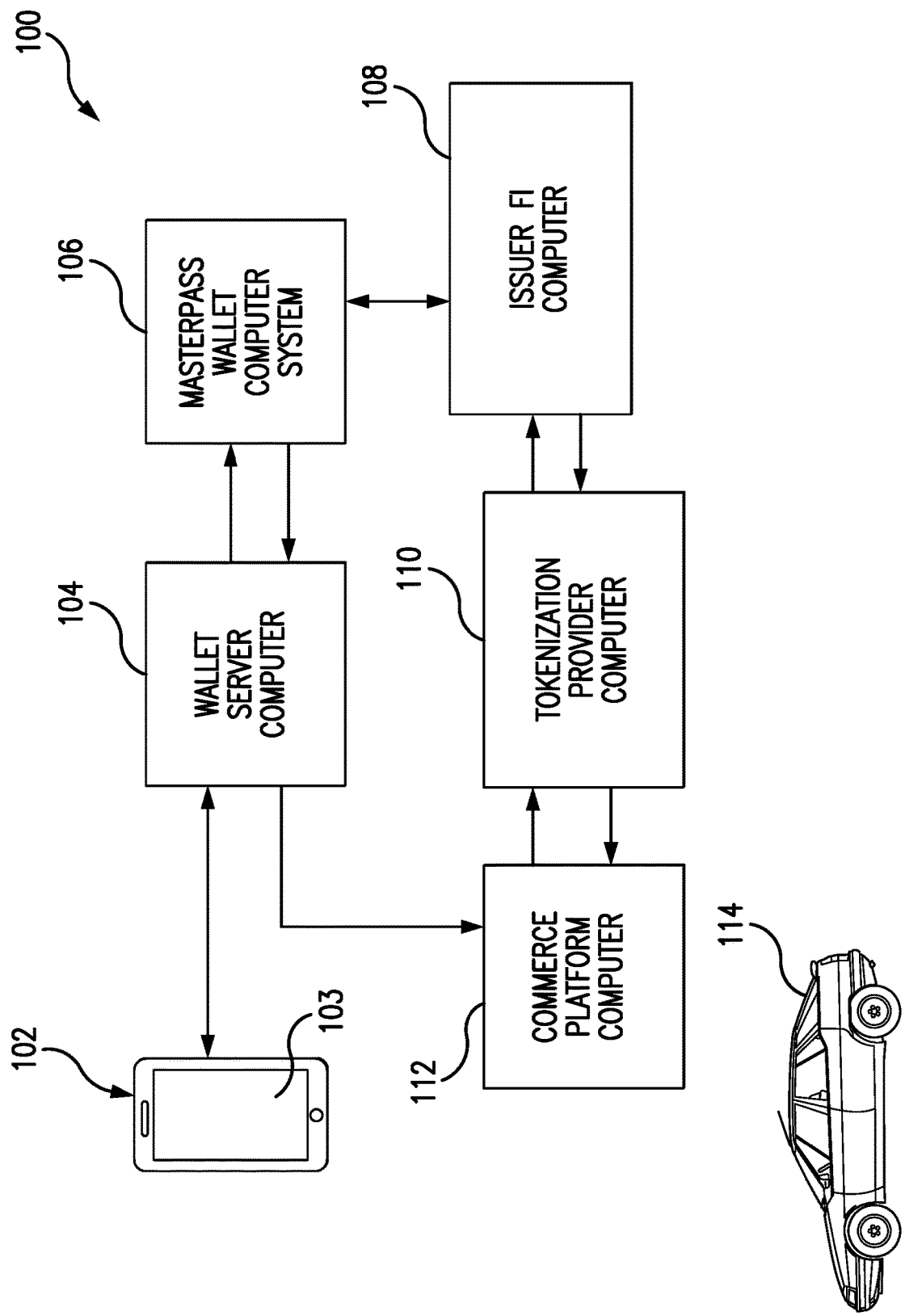
FIG. 1 is a block diagram that illustrates a "load flow" pursuant to some embodiments of the disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but one or more embodiments may be practiced without some or all of the specific details. In other instances, well-known process operations have not been described in detail in order not to unnecessarily obscure novel aspects.

Many terms will be used herein, the use of which is not intended to be limiting. Rather, such terms are used for convenience and ease of exposition. For example, as used herein, the term "user" may be used interchangeably with the term "cardholder" and/or "consumer," and these terms are used herein to refer to a consumer, person, individual, business or other entity that owns (or is authorized to use) a financial account, such as a payment card account (for example, a credit card account). In addition, the term "payment card account" may include a credit card account, a debit card account, and/or a deposit account or other type of financial account that an account holder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related transactions, which may be operated by a payment card system operator, such as Mastercard International Incorporated (the assignee of the present application), or a similar system. In some embodiments, the term "payment card system" may be limited to systems in which member financial institutions (such as banks) issue payment card accounts to individuals, businesses and/or other entities or organizations. In addition, the term "wallet" is used herein interchangeably with the term "digital wallet," wherein "wallet" may refer to the client (front-end) side or may refer to the entirety of the wallet solution, including the back-end system(s) utilized to initiate and/or complete financial transactions.

In general, and to introduce concepts of embodiments of this disclosure, some exemplary embodiments provide systems and methods for a wallet application (such as the MasterPass® wallet application provided by the assignee of the present application, Mastercard International Incorporated) to interact with third party wallets, applications or merchants, to secure payment credentials from the wallet application for tokenization. For simplicity and ease of exposition, the primary wallet application (e.g., the MasterPass® wallet application in some embodiments) will be referred to as the "wallet," and the third-party wallet, application, or merchant will be referred to herein as a "companion application." Other wallets and applications may be used, and thus these examples are provided as illustrative but not limiting examples herein.

Pursuant to some embodiments, as the user of the wallet authenticates to the wallet, and the issuer (associated with the wallet) generates and returns a token authentication value ("TAV") for the accounts of the issuer. This TAV, along with the payment credentials (including the cardholder's primary account number or PAN, and the expiration date) allow a companion application to tokenize without need for the cardholder's interaction. In some alternative embodiments, the issuer wallet transmits one or multiple PANs to a tokenization service provider, the tokenization service provider then sends a receipt back to the issuer wallet, and the wallet passes the receipt on to the companion app (instead of the PAN(s)).

Embodiments disclosed herein allow users to select account credentials to be shared with companion applications, so that each companion application can further tokenize the selected account credentials (associated with, for example, a credit card account of the user). Further, embodiments disclosed herein enhance the user experience by advantageously eliminating the need for users to further authenticate themselves with the issuer during tokenization. In addition, disclosed embodiments enhance wallets so that they can act as a centralized credential management system for tokenized user accounts.

Pursuant to some embodiments, the "companion applications" (or third-party wallets, or merchants) can integrate with a wallet (such as the MasterPass® wallet) in a variety of ways, including application to application, application to a server, and server to server. Such integrations may be configured to allow the wallet (such as the MasterPass® wallet) to return PANs and/or expiration dates and/or an optional TAV(s) and/or a tokenization service provider receipt, and for the companion application to perform processing to tokenize such data.

Pursuant to some embodiments, application to application integration may be performed using a wallet software development kit ("SDK") (such as the MasterPass® SDK) to identify and launch an installed wallet on a user's mobile device, such as on the user's smartphone. Once the wallet application is identified and the user has been successfully authenticated, payment credentials may be returned to the companion application via a server to server integration. To support the server to server integration option, wallet application programming interfaces ("APIs") may be used to indicate that payment credentials are being requested and/or returned for the purpose of tokenization by the companion application. To support a server to server integration, merchant APIs may be used to indicate that payment credentials are being requested and/or returned for the purpose of tokenization by the companion application. A server to server integration may also require, in some embodiments, that a token authentication value (TAV) can be returned when the PAN belongs to the issuer operating the wallet.

In embodiments disclosed herein, the term "digitization" means the act of digitizing a card account, turning it into a token, for use on a mobile device. The digitization service operates to check whether a card or card account is eligible to be digitized, whether the mobile device is eligible to be digitized to, facilitates the authentication of the cardholder (as necessary), creates a token for the card account, and provisions the token data to the target platform.

Features of some embodiments will now be described by reference to FIG. 1, which is a block diagram 100 depicting an example flow of information, data and/or messages to load payment account information to a companion application (which may, for example, be associated with an Internet of Things "IoT" device 114). As shown in FIG. 1, a number of entities or devices may interact to perform a load process in accordance with embodiments described herein, such as a mobile device 102 having a companion application stored therein, a wallet server 104 (which may be, for example, a MasterPass server), a wallet computer system 106 (shown for illustrative purposes as a MasterPass wallet computer system), an issuer financial institution (FI) computer 108 (which may be associated with the bank that issues the payment account), a tokenization service provider computer 110 (which may be, for example, the Mastercard Digital Enablement Service or "MDES") and a commerce platform computer 112 (which may be, for example an application server configured to allow interaction between third party commerce applications).

It should be understood that the system 100 illustrated by FIG. 1 includes only those components needed to illustrate the loading of payment account information to a companion application. However, those who are skilled in the art will recognize that a practical embodiment of the system 100 may process many or a large amount of such loading operations (including simultaneous operations), and thus may include a considerable number of wallet server computers 104, a plurality of different wallet providers and their computers, a considerable number of different issuers and their computers, numerous different tokenization providers, and a plurality of different commerce platforms and their computers. The system may also include a very large number of payment card account holders (users or consumers), who carry payment-enabled mobile devices.

Referring again to the system 100 of FIG. 1, the illustrative load process includes a user interacting with the companion application on the user's mobile device 102, and viewing a list of participating wallets (which may be displayed to the user on a display screen 103, which may also be a touch screen display). The consumer then selects the desired wallet from the list of participating wallets for use in the load process, and the selected wallet transmits data to the wallet server computer 104, which then communicates with the MasterPass wallet computer system 106. The MasterPass wallet computer then processes the received information to authenticate the user (to confirm that the user is authorized to interact with the wallet). The Masterpass wallet computer system 106 next communicates with the Issuer FI computer 108, which is associated with the user's payment account, and the MasterPass® wallet computer 106 returns payment account information to the wallet server computer 104. The wallet server computer 104 then passes the payment account information to the commerce platform 112 managing the companion application. Next, the commerce platform 112 performs processing to associate the payment account information with a request message to tokenize the payment account information, which request is next submitted to a tokenization provider computer 110. The tokenization provider computer 110 communicates with the Issuer FI computer 108, which approves the tokenization request and then provides the token information to the commerce platform 112.

In general, the illustrative load process 100 of FIG. 1 allows a "companion application" (such as a third-party wallet or other application) to interact with a consumer's wallet to obtain payment information which is then used to obtain a token for the payment information. The tokenized credentials are then associated with the companion application. In addition, as will be described further below, the tokenized credentials may then be managed through the wallet application. Thus, in the example shown in FIG. 1, the companion application is an application associated with an Internet of Things ("IoT") device (for example, the companion application may be associated with a "connected car" 114, which is a car that is equipped with Internet access, and which may also be connected to a wireless local area network (LAN) or has Bluetooth™ functionality, or otherwise be capable of wireless communications). Thus, when the consumer wishes to utilize, for example, the companion application associated with the connected car 114 to make a purchase, the tokenized credentials associated with that companion application are utilized. It should be understood that, in some other embodiments, the companion application may instead be associated with a third-party application, or with a merchant.

Figure 2:
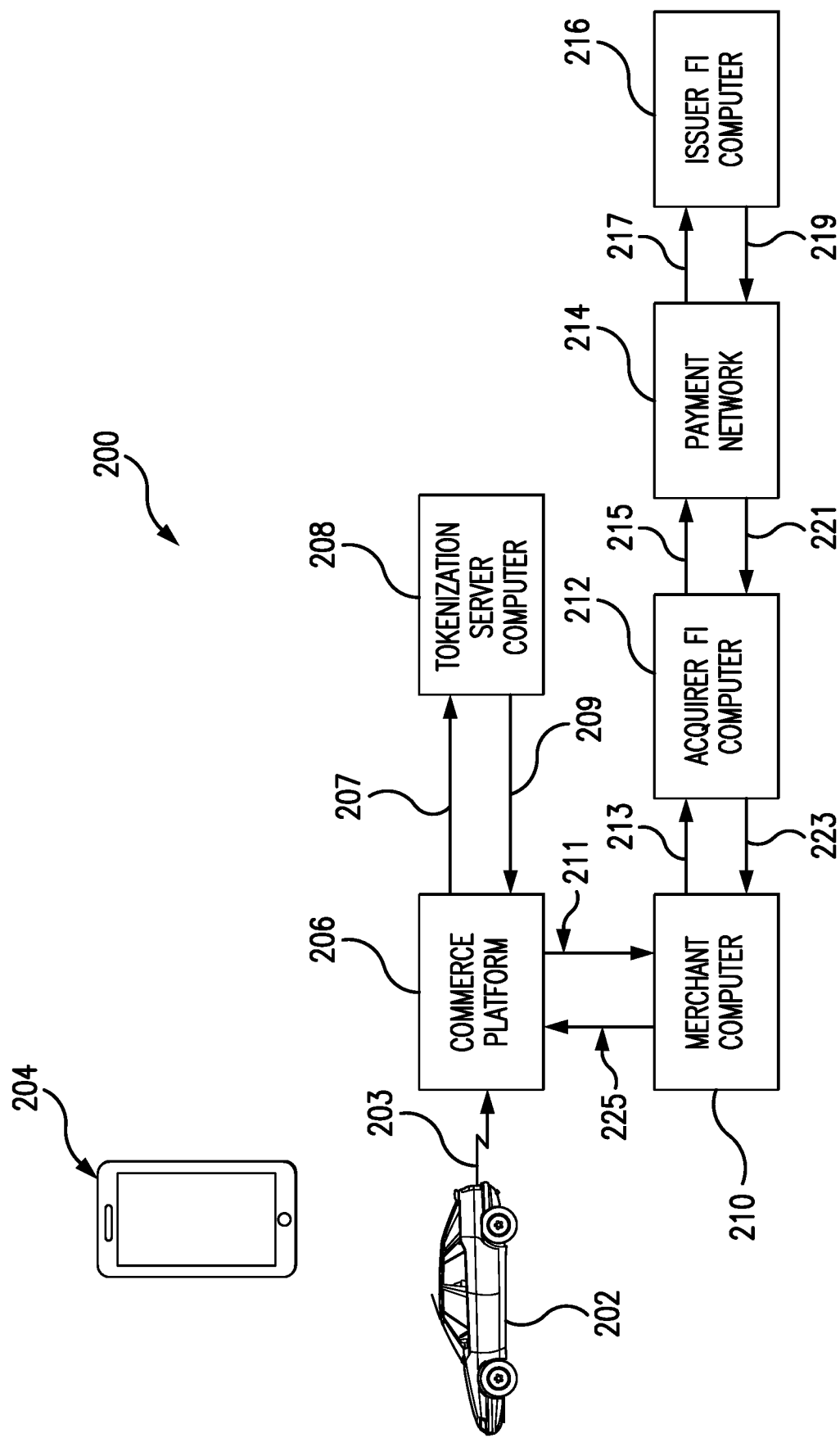
FIG. 2 is a block diagram that illustrates a "purchase flow" pursuant to some embodiments of the disclosure.

Reference is now made to FIG. 2, where an illustrative "purchase" flow transaction block diagram 200 is shown. The purchase flow transaction block diagram 200 involves an IoT device 202, which was previously the subject of a "load" transaction (as illustrated by FIG. 1). In the illustrative purchase flow block diagram 200 of FIG. 2, the IoT device 202 (shown as a connected automobile to signify a smart car application or device) has already been associated with tokenized payment credentials (for example, by a user running a companion application on his or her smartphone 204). Thus, the user associated with the IoT device 202 may initiate a purchase transaction, for example, by utilizing a user interface ("UI") (not shown) that may be presented on a display screen (not shown) located on the dashboard of the IoT device 202. In this example, the IoT device 202 next transmits 203 a purchase transaction request to the commerce platform 206 associated with the IoT device 202, which authenticates the IoT device (and/or the user). Next, the commerce platform 206 submits 207 a transaction reference identifier to a tokenization service computer 208 (which may be the MDES), which then provides 209 a token and a cryptogram to the commerce platform 206. Next, the commerce platform provides 211 the token and the cryptogram to a merchant computer 210 of a merchant associated with the purchase transaction, and the merchant computer 210 creates an authorization request (which includes a purchase amount and other transaction details, as well as the token and the cryptogram). The merchant computer 210 then transmits 213 the authorization request to an acquirer financial institution (FI) computer 212. The acquirer FI computer 212 then passes 215 the authorization request to a payment network 214 (which may be, for example, the Mastercard payment network). The payment network 214 determines the relevant issuer FI from a plurality of issuer FIs (not shown), and then routes 217 the authorization request to the relevant issuer FI computer 216 (of the issuer FI which issued the payment account to the user) for authorization approval. When the authorization approval is received 219, the payment network 214 returns 221 the authorization approval to the acquirer FI computer 212 for routing 223 to the merchant computer 210. The merchant computer 210 then confirms the transaction and transmits 225 a purchase transaction authorization response to the commerce platform 206 to complete the purchase transaction involving the IoT device 202. In some embodiments, the commerce platform 206 may also transmit an authorization message or purchase confirmation message to the IoT device 202 and/or to the mobile device 204 of the user.

Figure 6:
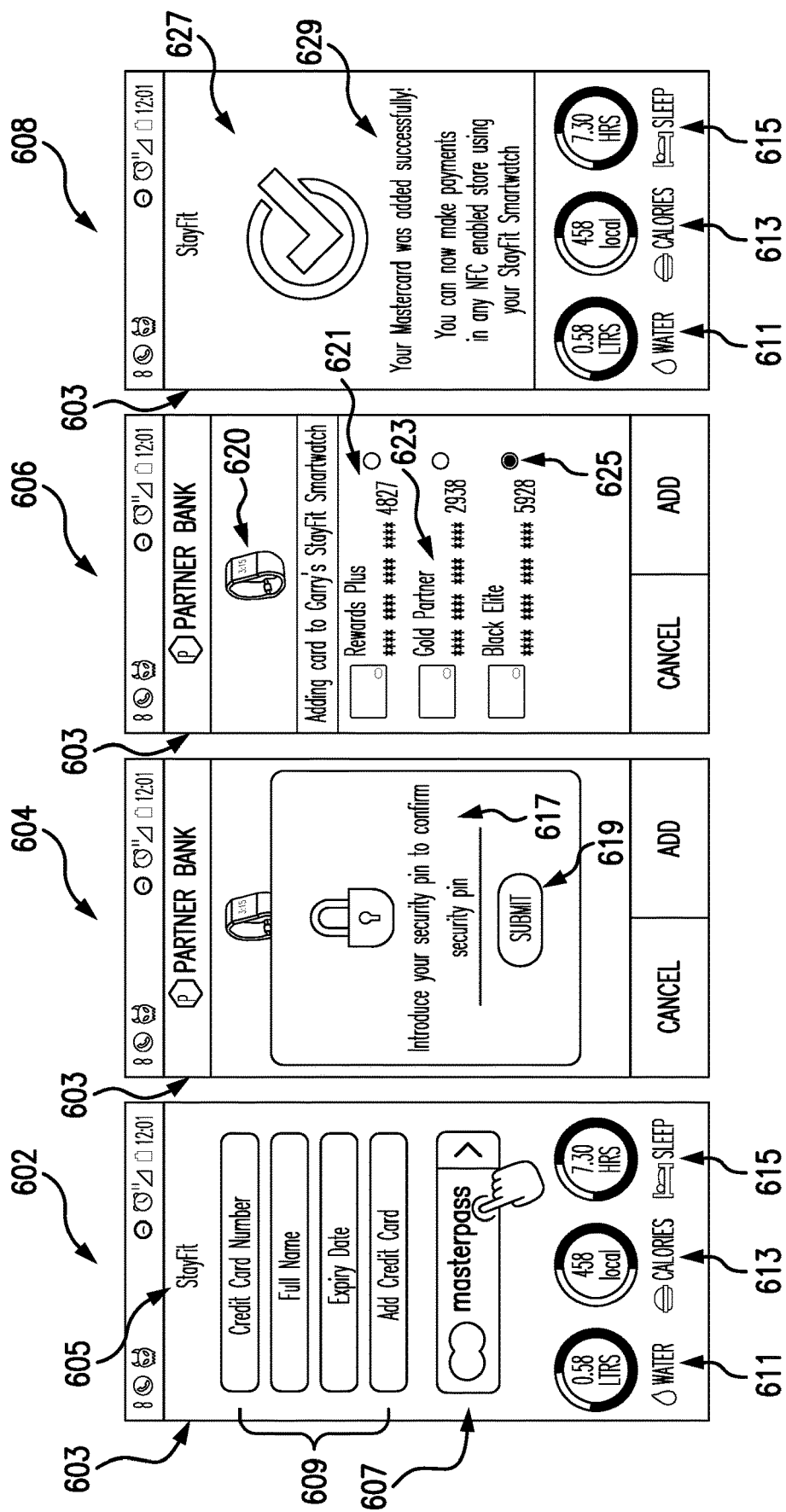
FIGS. 6A-6D are a series of screen shots of illustrative user interfaces showing the pull process of FIG. 3.
Figure 7:
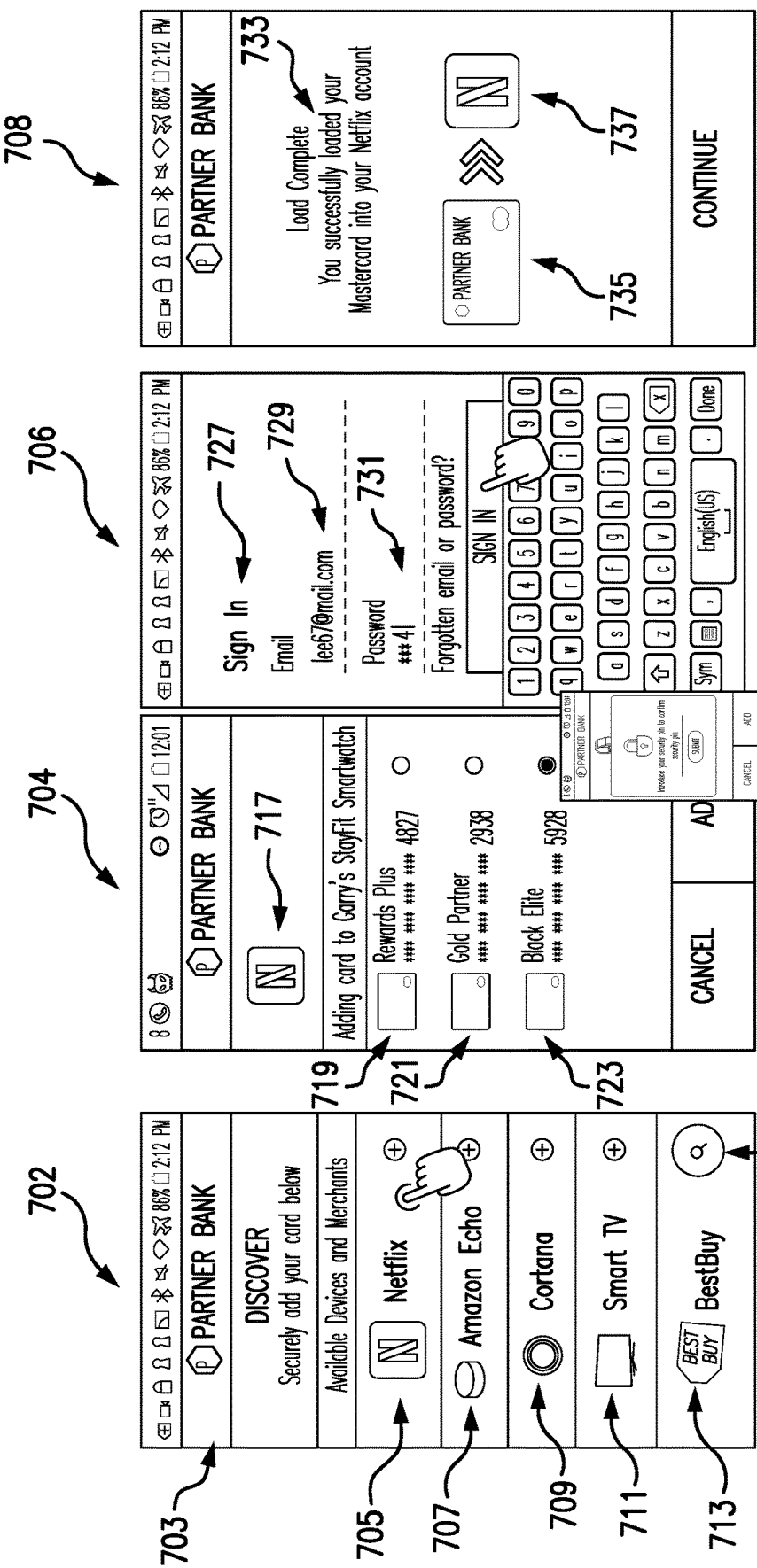
FIGS. 7A-7D are a series of screen shots of illustrative user interfaces showing the push process of FIG. 4.

Pursuant to some embodiments, systems and methods of the present invention allow an improved user experience, with a one to one relationship between a user's payment accounts and the devices and/or applications with which they are associated. Further, the load process may be performed in multiple ways, including as a "pull" transaction (described above with regard to FIG. 1), wherein the companion application "pulls" information from the user's wallet (as will be described further below in conjunction with FIGS. 3 and 6, below) as well as a "push" transaction, wherein the user's wallet "pushes" information to the companion application (as will be described further below with reference to FIGS. 4 and 7, below).

Figure 8:
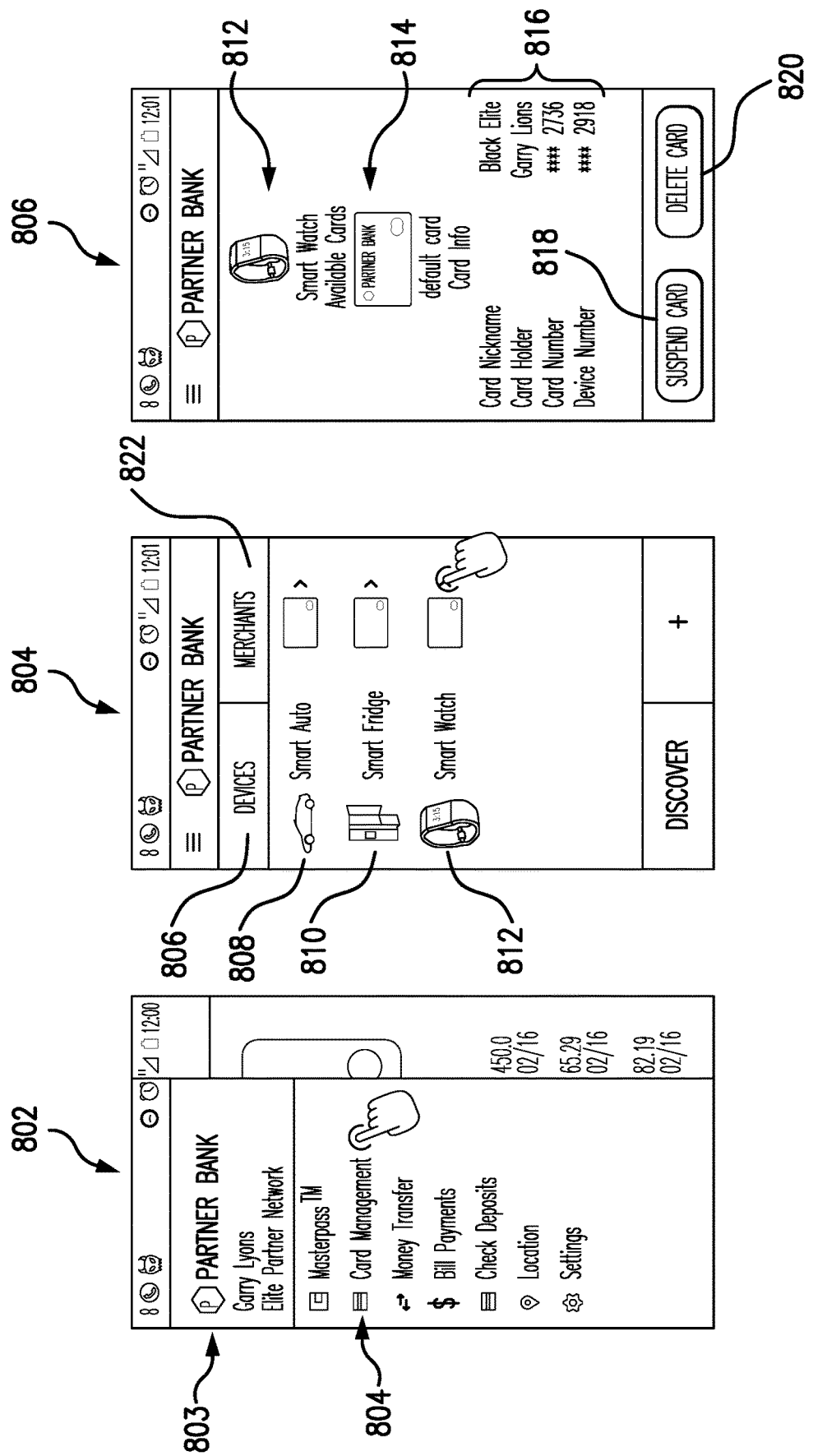
FIGS. 8A-8C are a series of screen shots of illustrative user interfaces showing the token management process of FIG. 5.

Accordingly, embodiments described herein solve the technological problem of how to permit a user to easily and efficiently associate one or more payment account(s) contained within a primary wallet application with a companion device (for example, a wearable health monitoring device), and/or with a third party wallet (for example, PayPal®), and/or with a third party application (such as Netflix), and/or with a merchant application (for example, with a merchant website, such as Walmart.com® or Amazon.com®) in a secure manner. An embodiment described herein also solves the technological problem of how to permit a user to easily and efficiently manage his or her tokenized payment accounts to prevent and/or minimize fraud, which is further described herein below with reference to FIGS. 5 and 8.

Figure 3:
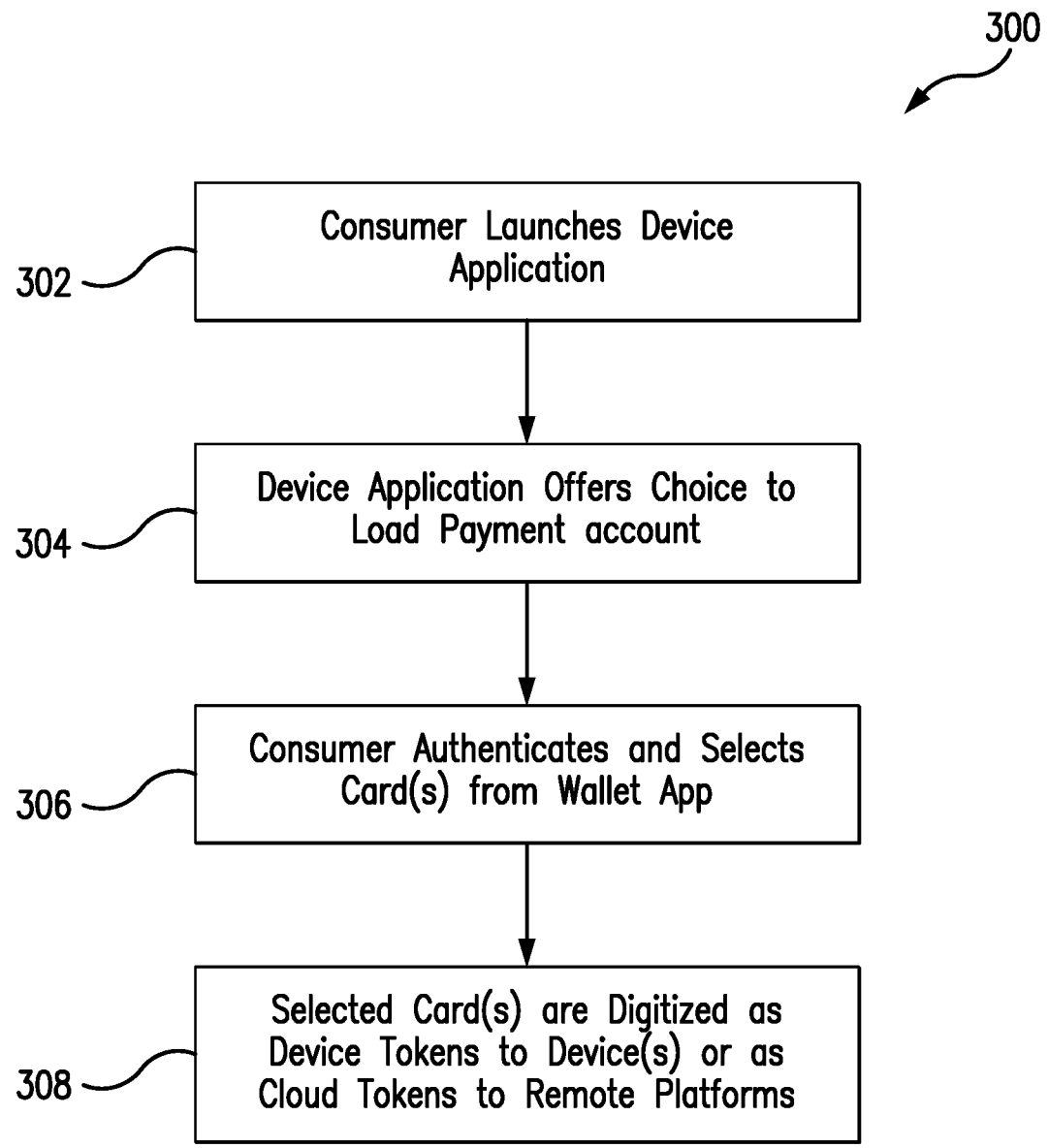
FIG. 3 is a flow diagram illustrating a "pull" process pursuant to some embodiments of the disclosure.

FIG. 3 is a flowchart illustrating a load transaction 300 via a "pull" process in accordance with some embodiments. In some implementations, the user interacts with a companion application running on his or her mobile device, such as a smartphone or tablet computer, to initiate the load transaction. For example, the user may interact with her smartphone to launch 302 a device application (referred to herein as a "companion application," which in some examples corresponds to an IoT application associated with an internet-connected device, such as a wearable device like a smart watch or health device) with an intent to load the companion application with payment card information. Once launched, the companion application may display 304 a user interface ("UI") on a display screen of the user's mobile device which offers the user the choice to load one or more payment card accounts from a wallet application to associate with the companion application (and thus, in some examples, for association with the internet-connected device). The consumer next authenticates 306 to the companion application (for example, by entering a personal identification number ("PIN") or other user credential(s)), and upon successful user authentication the user selects one or more payment accounts from a list of payment accounts that are in the user's wallet (which payment accounts may correspond to, for example, payment card accounts such as credit card accounts, debit card accounts, merchant-affiliated payment card accounts, and the like). The selected payment account(s) is/are then digitized 308 as one or more device token(s) to the device (for example, in the manner described above). In implementations where the companion application is a third-party server-based wallet or is a merchant application, the selected payment account may be digitized as a cloud token (e.g., MDES for commerce platforms token or MDES for merchants token) to a remote platform (such as to a third party server based wallet platform, or to merchant platform).

FIGS. 6A to 6D illustrate a series or sequence of screen shots 602, 604, 606 and 608 of a user mobile device display screen 603 (for example, a display screen of a consumer's or user's smartphone) of a user interface (UI) generated by a companion application, and which illustrate one or more elements of the load process of FIG. 3. For example, a mobile device processor (shown in FIG. 9) may receive an instruction to launch a "StayFit" companion application associated with a StayFit device (not shown), which may be an internet-connected, wearable, health-monitoring device of a type typically worn on the wrist by a consumer. Thus, the screen shot 602 of FIG. 6A shows the StayFit companion application UI 605 on the display screen 603, which includes health data being displayed to the user, such as the amount of water consumed 611, the number of calories consumed 613, and the number of hours of sleep obtained 615 by the user, for example, in a twenty-four hour period or the like. Of course, other and/or additional types of health data (for example, average heart rate) could be displayed as well.

Referring again to the screen shot 602 of FIG. 6A, in some embodiments the companion application 605 displays an "Add from MasterPass" button 607 which may be selected by the user to load one or more payment accounts from the user's digital wallet (his or her MasterPass wallet, in this example). (In addition, in some embodiments the companion application may include a display of payment card account data entry fields 609 for the user to manually enter information concerning a payment card account to associate). In the present example, the user selects the Add from MasterPass button 607, and then authenticates to the companion application (e.g., by providing a PIN and/or other user authentication credentials, such as a fingerprint and/or a voiceprint). For example, as shown in FIG. 6B, after selection of the Add from MasterPass button 607 a "Partner Bank" display 604 may be invoked on the mobile device display screen 603, which includes an input field 617 for the consumer to provide his or her PIN (shown as a "security pin" field), and a "Submit" button 619 to push after entry of the PIN.

After entering his or her PIN and pushing the "Submit" button 619, the mobile device processor authenticates the user, and causes the companion application to provide a selection screen depicted by the screen shot 606 of FIG. 6C on the display screen 603. The selection screen includes a StayFit icon 620 that reminds the consumer that the load process is being undertaken for this device, and several payment card account selections 621, 623 and 625, which are the available payment card accounts in the user's wallet (which can be associated with the StayFit companion application). In the present example, the consumer has selected the "Black Elite" card 625 from his or her "Partner Bank" wallet, and the payment card account data for the "Black Elite" card is then digitized as a device token to the device (here, the "StayFit" wearable device) associated with the companion application. Lastly, after the device token is provided to the device, the mobile device processor may provide a confirmation message on the display screen 603, such as that shown by the screenshot 608 of FIG. 6D, which includes a checkmark icon 627 and a message 629 confirming that the "Black Elite" card has been successfully added, which means that payments can now be made by using the consumer's "Stayfit" health-monitoring device in conjunction with a near-field communication ("NFC") device (such as an NFC-enabled cash register in a retail store).

Thus, in some embodiments a process for associating payment card credentials with a companion application includes a mobile device processor of a consumer's mobile device receiving, via an input component such as a touch screen, an instruction to launch a companion application. The mobile device processor then displays a companion application user interface that includes an option to obtain payment card credentials from at least one wallet application, receives selection of the option, displays a list of payment card accounts associated with the selected wallet application on the display screen for selection by the user to associate with the companion application, and receives via the input component, a selection of at least one payment card account to associate with the companion application. The mobile device processor then transmits payment account credentials of the selected payment card account to a wallet server computer, receives a companion token representing a digitization of the selected payment card account from the wallet server computer, and associates the companion token with the companion application. In some implementations, prior to displaying the list of payment card accounts associated with the wallet application, he mobile device processor prompts for the user to provide authentication data, receives authentication data from the user (which may be input via a biometric sensor or the like), and authenticates the user before transmitting payment account credentials of the selected payment card account to a wallet server computer for digitization. In some embodiments, the process also includes, when the companion application is associated with a consumer device, transmitting the companion token to the consumer device which enables the consumer to utilize the consumer device to conduct transactions.

Figure 4:
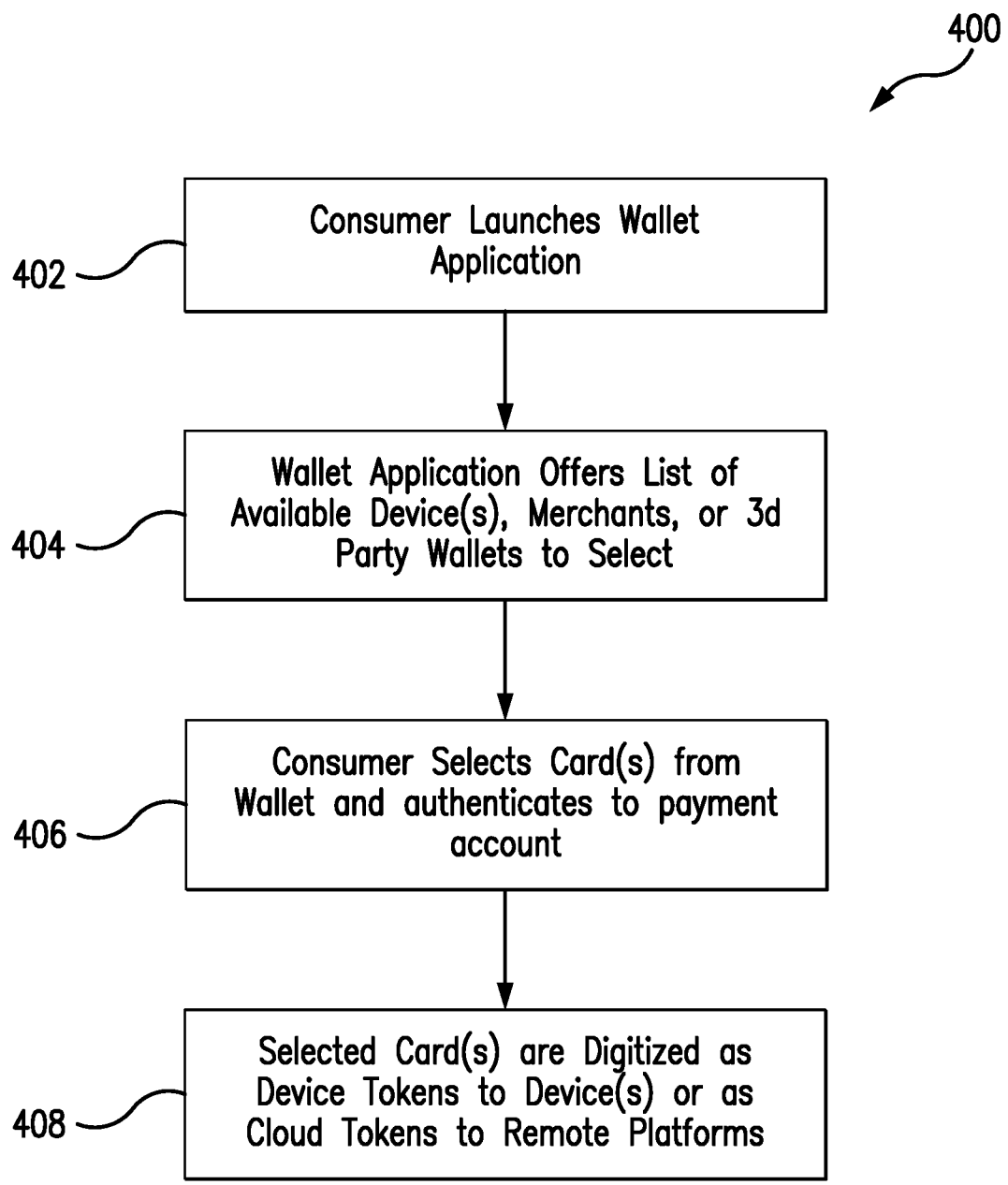
FIG. 4 is a flow diagram illustrating a "push" process pursuant to some embodiments of the disclosure.

FIG. 4 is a flowchart illustrating a load transaction 400 via a "push" process in accordance with some embodiments. In FIG. 4, the user interacts with his mobile device and selects to launch 402 a wallet application (e.g., such as the MasterPass wallet) with an intent to load a payment card account to a companion application or device. Processing continues with the wallet application providing 404 a list of available device(s) and/or companion applications for selection by the user. The user selects 406 a companion application to associate with one or more payment accounts, and then selects one or more payment card accounts from his wallet. In some embodiments, the user is then prompted to authenticate himself to the selected payment account(s). In addition, in some embodiments the user may also be prompted to authenticate himself to the companion application. Lastly, the selected payment card account(s) is/are digitized 408 as a device token (or device tokens) to the selected device. In implementations where the companion application is a third party server based wallet application or is a merchant application, the selected payment card account may be digitized as a cloud token to a remote platform.

FIGS. 7A-7D illustrate a series of screen shots 702, 704, 706 and 708 of a display screen 703 of a user's mobile device associated with a user selection of a push load process from a mobile wallet application, which may be associated with one or more elements of the load process of FIG. 4. FIG. 7A depicts an embodiment of a push load process user interface (UI) 702 provided by the user's wallet associated with "Partner Bank," as shown on the display screen 703. A list of available devices and merchants is shown for selection by the user associated with a plurality of third party applications, devices and/or merchants. In the present example, illustrated are a Netflix® icon 705 (an application), an Amazon Echo® icon 707 (a device), a Cortana® icon 709 (a third-party application), a "Smart" TV icon 711 (a device), and BestBuy® icon 713 (a merchant). If a particular device, application and/or merchant is not present in the list, then the user may select the query icon 715 to conduct a search for other devices, applications and/or merchants for selection. In the present example, the user is shown selecting the Netflix® icon 705 for association with a payment account. Thus, the companion application for the user's Netflix® account will be associated with one or more of the user's payment accounts.

Next, as shown in FIG. 7B the mobile device processor running the "Partner Bank" wallet application displays the Netflix logo 717 (to confirm or remind the user that this is the selected companion application) above a list of payment accounts. As shown, the user can select one or more of a "Rewards Plus" account 719, a "Gold Partner" account 721, or a "Black Elite" account 723, and in this example has selected the "Black Elite" payment card account 723 from the wallet. As shown by FIG. 7B, in some embodiments the user may then be prompted 725 to provide authentication data (such as a PIN) to authenticate himself to the selected payment card account. As shown in the screen shot 706 of FIG. 7C, the user may also be prompted to "Sign In" 727 or otherwise authenticate himself to the companion application, for example, by entering an email address 729 and a password 731. Upon successful authentication, the selected payment card account is then digitized as, for example, a cloud token to the companion application for Netflix®. In some embodiments, as shown in the screen shot 708 of FIG. 7D, the mobile device processor may then generate and display a confirmation message 733 on the mobile device display screen confirming that the "Black Elite" payment account was successfully loaded to the user's Netflix account. In some implementations, a representation 735 of the user's "Black Elite" payment card may also be shown next to the Netflix logo 737. It should also be understood that, in implementations where the user selects a device (such as the Amazon Echo device 707) for loading via the push loading process, then upon successful user authentication the selected payment card account is digitized as a device token to the device. Thus, in such a case, the user's Amazon Echo device can then be used to conduct purchase transactions with the device token.

Thus, in some embodiments a process for associating payment card credentials with a companion application includes a mobile device processor of a consumer's mobile device receiving from an input component (such as a touch screen) an instruction to launch a wallet application. The mobile device processor then displays a wallet application user interface that includes a list of available companion applications associated with at least one of available devices, applications and merchants on the display screen, receives selection of a companion application, displays a list of available payment card accounts of the wallet application for selection by the user to associate with the companion application, and receives a selection of at least one payment card account. The mobile device processor then transmits payment account credentials of the selected payment card account to a wallet server computer, receives a companion token representing a digitization of the selected payment card account from the wallet server computer, and associates the companion token with the companion application. In some implementations, before displaying the list of available payment card accounts, the mobile device processor prompts the user to provide authentication data, receives authentication data from the user, and authenticates the user before transmitting payment account credentials of the selected payment card account to a wallet server computer for digitization. In some embodiments, when the companion application is associated with a consumer device, the mobile device processor transmits the companion token to the consumer device so that the consumer can utilize the consumer device to conduct transactions.

Figure 5:
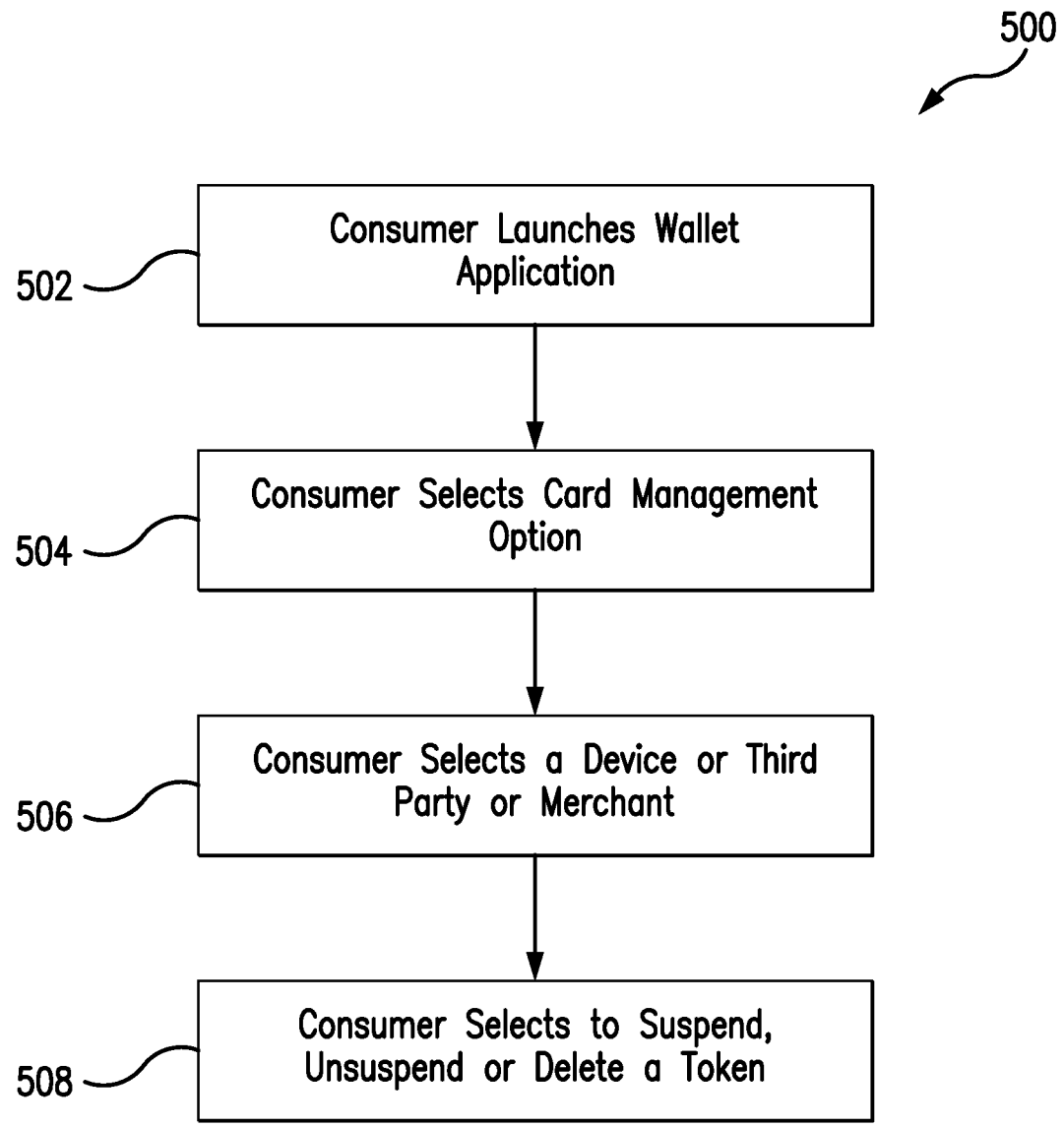
FIG. 5 is a flow diagram illustrating a token management process pursuant to some embodiments of the disclosure.

Pursuant to some embodiments, the user may interact with the wallet application to administer and/or manage her tokenized credentials that have been allocated for use with different companion applications or devices. FIG. 5 illustrates an embodiment of a token management process 500 in accordance with some embodiments. The user or consumer launches 502 a wallet application on his or her mobile device, and then selects 504 a card management option to view his or her payment card accounts that have been tokenized. In some embodiments, the consumer's mobile device displays a list of devices, third parties and/or merchants on a touch screen (or display screen), and then the user selects 506 one of the devices, third parties or merchants to manage. The user or consumer is then presented with a touch screen display of the selected device, third party or merchant, and in some embodiments, may choose or select 508 to either suspend, unsuspend, or delete a token.

FIGS. 8A-8C illustrate a series of screen shots 802, 804 and 806 of a touch screen display 803 of a user's mobile device associated with the token management process illustrated by FIG. 5, and in accordance with some embodiments. FIG. 8A depicts an embodiment of a wallet application user interface (UI) 802 provided by the user's wallet associated with "Partner Bank" on the touch screen 803. The wallet application UI 802 includes a plurality of options, including one for "card management" 804. When the user selects the card management option 804, the mobile device processor causes the wallet application to provide a device list 806 that includes icons representing a "Smart Auto" 808, a "Smart Fridge" 810, and a "Smart Watch" 812 along with representations of their device tokens (which here are depicted as credit card and/or debit card representations, which are associated with one or more of the user's payment accounts). In the present example, the user selects the "Smart Watch" icon 812, and then the mobile device processor causes the wallet application to display a device token management screen 806 which includes the representation of the "Smart Watch" icon 812 at the top, a payment card representation 814 beneath it, payment card information 816, a "Suspend Card" button 818 and a "Delete Card" button 820. In some implementations, if the user had previously suspended the device token for the "Smart Watch" 812, then an "Unsuspend Card" button (not shown) would be displayed along with the "Delete Card" button 820. In this case, the user would then be able to either suspend or delete that payment card account with regard to the device token for the Smart Watch. Referring again to FIG. 8B, in order to view a list of merchants and associated payment card accounts to manage the companion application tokens for merchants, then the user would select the merchant tab 822. In this case, the user would then be able to review a list of merchants and corresponding merchant application tokens.

Figure 9:
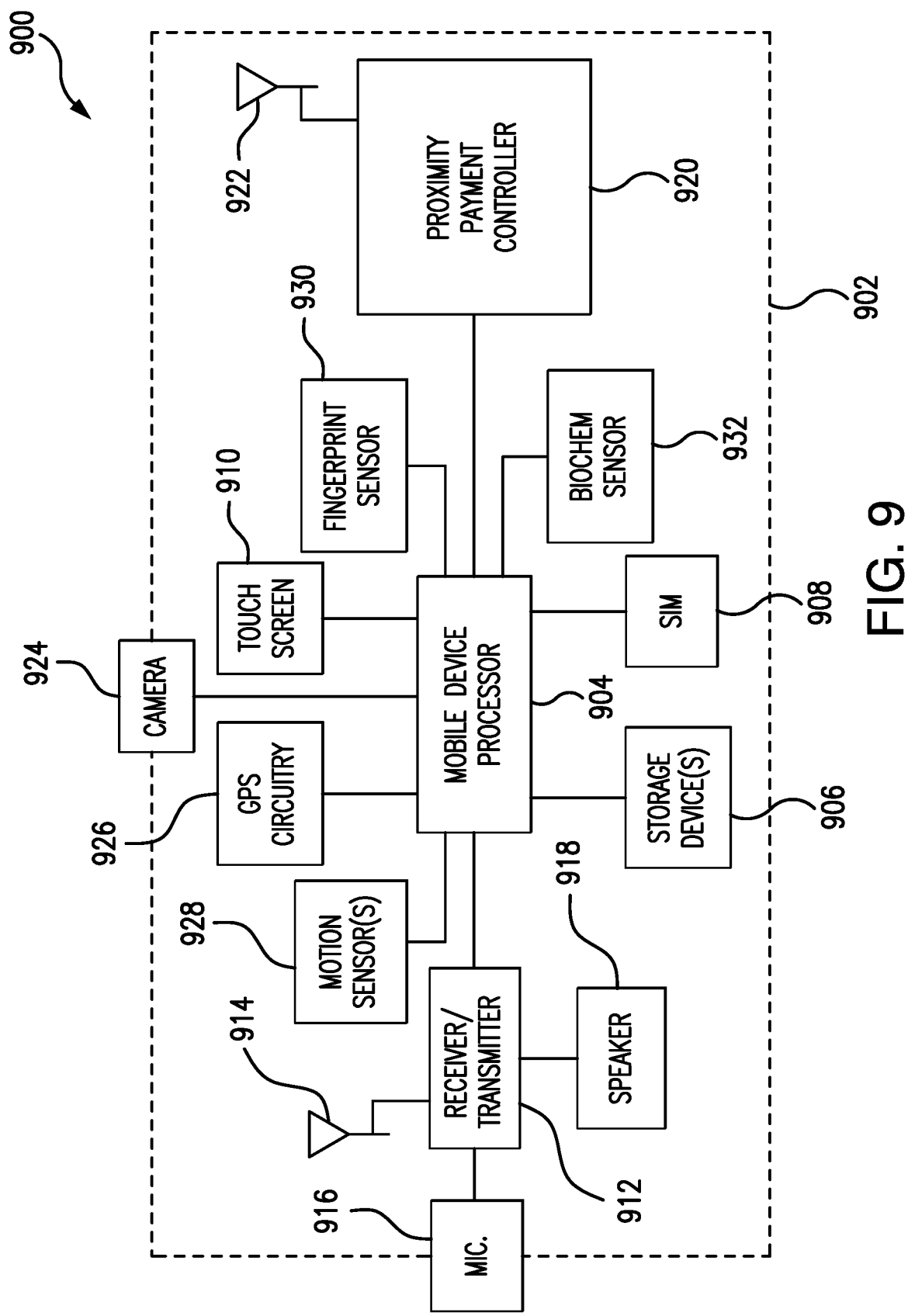
FIG. 9 is a block diagram of an example of a user mobile device to illustrate some hardware aspects in accordance with embodiments of the disclosure.

FIG. 9 is a block diagram of an embodiment of a user mobile device 900 illustrating some hardware aspects that may be utilized during the "pull" transaction load process (wherein the companion application "pulls" information from the user's wallet), and/or that may be used during the "push" transaction load process (wherein the user's wallet "pushes" information to the companion application) as disclosed herein. In addition, the user mobile device 900 may include hardware aspects that also can be used by a consumer in association with one or more wallet applications to easily and efficiently manage his or her tokenized payment accounts, for example, to prevent and/or minimize fraud.

Referring again to FIG. 9, in some embodiments the user mobile device 900 is a mobile telephone (such as a smartphone) capable of conducting online transactions, and that may (but need not) have capabilities for functioning as a contactless payment device. Thus, the mobile device 900 may be a payment-enabled mobile telephone capable of online purchase transactions, and may include hardware that is configured to provide novel functionality as described herein. In some other embodiments, however, novel functionality as described herein may result at least partially from novel software and/or middleware and/or firmware components that program or instruct one or more mobile device processors of the mobile device 900.

The mobile device 900 may include a conventional housing (indicated by dashed line 902) that contains and/or supports the other components of the mobile telephone, such as a mobile device processor 904 for controlling over-all operation. The mobile device processor 904 may be a customized processor that is suitably programmed to allow the mobile device to permit the use of a push load transaction and/or a pull load transaction for associating a companion application with one or more tokens associated with payment card accounts, and to allow the user to manage the payment tokens as disclosed herein. The mobile device processor may also be configured to permit a consumer or user to engage in data communications and/or text messaging with other wireless devices and/or electronic devices, and/or to allow for interaction with web pages accessed via browser software over the Internet to conduct transactions, such as purchase transactions. Other components of the mobile device 900, which are in communication with and/or are controlled by the mobile device processor 904, include one or more storage devices 906 (for example, program memory devices and/or working memory and/or secure storage devices, and the like), a subscriber identification module (SIM) card 908, and a touch screen display 910 for displaying information and/or for receiving user input.

The mobile device 900 also includes receive/transmit circuitry 912 that is also in communication with and/or controlled by the mobile device processor 904. The receive/transmit circuitry 912 is operably coupled to an antenna 914 and provides the communication channel(s) by which the mobile device 900 communicates via a mobile network (not shown). The mobile device 900 further includes a microphone 916 operably coupled to the receive/transmit circuitry 912, and is operable to receive voice input from the user. In addition, a speaker 918 is also operably coupled to the receive/transmit circuitry 912 and provides sound output to the user.

In some embodiments, the mobile device 900 may also include a proximity payment controller 920 which may be a specially designed integrated circuit (IC) or chipset. The proximity payment controller 920 may be a specially designed or custom-made microprocessor that is operably connected to an antenna 922, and may function to interact with a Radio Frequency Identification (RFID) and/or Near Field Communication (NFC) proximity reader (not shown), which may be associated with, for example, a Point-of-Sale (POS) terminal of a merchant.

The user's mobile device 900 may include one or more sensors and/or circuitry that functions to provide and/or to obtain user identification data. For example, the user mobile device may be a smartphone or tablet computer including one or more authenticators, such as an integrated camera 924, global positioning sensor (GPS) circuitry 926, one or more motion sensors 928, a fingerprint sensor 930 and/or a biochemical sensor 932 that are operably connected to the mobile device processor 904. Some of the authenticators can be used to perform user authentication in association with one or more wallet applications and/or companion applications, and may also be functional to provide other types of data, such as mobile device identification data. For example, the integrated camera 924 may be operational to take digital pictures for use in a user authentication process, for example, to take a picture of the user's face and/or of other relevant portions of the user (or of the immediate environment) for authentication purposes. The integrated camera 924 may also be functional for other purposes, such as for reading two-dimensional (2D) and/or three-dimensional (3D) barcodes to obtain information.

Referring again to FIG. 9, the GPS circuitry 926 may be operable to generate information concerning the location of the mobile device 900. In addition, the motion sensor(s) 928 may be operable to generate motion data, for example, that can be utilized by the mobile device processor 904 to authenticate a user. For example, data may be generated that can be used to identify the user's walking style or gait. In another example, the motion sensor(s) 928 may operate to generate force data associated with, for example, the force generated by the user's finger when he or she touches the touch screen 910. Thus, the fingerprint sensor 930 may include a touch pad or other component (not shown) for use by the user to touch or swipe his or her index finger when fingerprint data is required to authenticate the user. In addition, the biochemical sensor 932 may include one or more components and/or sensors operable to obtain user biological data, such as breath data and/or saliva from the user, and/or other types of biological data which may be analyzed to authenticate the user of the mobile device 900. The user mobile device 900 may also contain one or more other types of sensors, such as an iris scanner device (not shown) or other biometric sensor(s) capable of generating iris scan data of a user's eye, which may be useful for identifying biometric or other personal data of the mobile device user.

It should be understood that, pursuant to some embodiments, the tokenization service (e.g., described in conjunction with FIGS. 1 and 2 above as the MDES service) may be configured to operate pursuant to the "Payment Token Interoperability Standard" (issued by Mastercard International Incorporated, the assignee hereof, Visa, and American Express in November 2013). Reference is also made to the EMV® Payment Tokenization Specification, published March 2014, and available for downloading from www.emvco.com.

As used herein and in the appended claims, the term "computer" should be understood to encompass a single computer or two or more computers in communication with each other. In addition, as used herein and in the appended claims, a "server" includes a computer device or system that responds to numerous requests for service from other devices.

As used herein and in the appended claims, the term "processor" should be understood to encompass a single processor or two or more processors in communication with each other or a computer network or computer system.

Moreover, as used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable, including simultaneous performance of at least some steps.

As used herein and in the appended claims, the term "payment account" includes a credit card account, a deposit account that the account holder may access using a debit card, a prepaid card account, or any other type of account from which payment transactions may be consummated. The terms "payment account" and "payment card account" and "payment card" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment system" refers to a system for handling purchase transactions and related transactions. An example of such a system is the one operated by Mastercard International Incorporated, the assignee of the present disclosure. In some embodiments, the term "payment system" may be limited to systems in which member financial institutions issue payment accounts to individuals, businesses and/or other organizations.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method for provisioning payment card credentials to an Internet of Things (IoT) device using a companion application, comprising:
    receiving, by a mobile device processor of a consumer's mobile device from an input component, an instruction by a user to launch a companion application, wherein the companion application is associated with a separate Internet of Things (IoT) device;
    launching, by the mobile device processor in response to receiving the instruction to launch, the companion application;
    displaying, by the mobile device processor on a display screen after launching the companion application, a companion application user interface (UI) comprising one of user data or a list of available merchants and devices, and further comprising an option to obtain payment card credentials from a wallet application of the user;
    receiving, by the mobile device processor via the input component, selection of the option to obtain the payment card credentials by the user from the companion application UI;
    displaying, by the mobile device processor on the display screen, a prompt for the user to provide user authentication data to the companion application via a biometric sensor;
    receiving, by the companion application running on the mobile device processor from the biometric sensor collecting the authentication data from the user, the user authentication data;
    authenticating, by the companion application running on the mobile device processor, the user based on the user authentication data received from the biometric sensor;
    displaying, in response to authentication of the user and the selection of the option to obtain payment card credentials by the mobile device processor on the display screen, a selection screen comprising one of an icon identifying the IoT device or an icon identifying the companion application and a list of payment card accounts associated with the wallet application;
    receiving, by the mobile device processor via the input component, a selection of a payment card account by the user from the selection screen;
    transmitting, by the mobile device processor to a wallet server computer in response to the selection, payment account credentials of the selected payment card account;
    receiving, by the mobile device processor from the wallet server computer, a companion token representing a digitization of the selected payment card account;
    associating, by the mobile device processor, the companion token with the companion application;
    transmitting, by the mobile device processor to the IoT device associated with the companion application, the companion token; and
    displaying, by the mobile device processor on the display screen, a confirmation message indicating that the companion token has been loaded to the IoT device.

2. The method of claim 1, further comprising, after receiving the user authentication data from the biometric sensor:
    determining, by the companion application running on the mobile device processor, that the user authentication data is incorrect; and
    terminating, by the mobile device processor, the device token association process.

3. The method of claim 1, wherein the companion application user interface further comprises an option to manually enter payment card credentials.

4. A system for provisioning payment card credentials to an Internet of Things (IoT) device using a companion application, comprising:
    a consumer mobile device comprising a mobile device processor operably connected to a memory, an input component, at least one biometric sensor and a display screen;
    an Internet of Things (IoT) device operable for communications with the consumer mobile device;
    a wallet server computer operably connected to the consumer mobile device;
    an issuer financial institution computer operably connected to the wallet server computer;
    a tokenization provider computer operably connected to the issuer FI computer; and
    a commerce platform computer operably connected to the wallet server computer and to the tokenization provider computer;
    wherein the memory of the consumer mobile device comprises instructions configured to cause the mobile device processor to:
        receive, via the input component, an instruction by a user to launch a companion application associated with the IoT device;
        launch the companion application_in response to receiving the instruction to launch;
        display, on the display screen after launching the companion application, a companion application user interface (UI) comprising one of user data or a list of available merchants and devices, and further comprising an option to obtain payment card credentials from a wallet application of the user;

receive via the input component, selection of the option to obtain the payment card credentials by the user from the companion application UI;

display a prompt for the user on the display screen to provide user authentication data to the companion application via the biometric sensor;

receive, by the companion application from the biometric sensor collecting the authentication data from the user, the user authentication data;

authenticate, by the companion application, the user based on the user authentication data received from the biometric sensor;

display, in response to authentication of the user and the selection of the option to obtain payment card credentials, on the display screen, a selection screen comprising one of an icon identifying the IoT device or an icon identifying the companion application and a list of payment card accounts associated with the wallet application;

receive via the input component, a selection of a payment card account by the user from the selection screen;

transmit, in response to the selection, payment account credentials of the selected payment card account to the wallet server computer;

receive a companion token representing a digitization of the selected payment card account from the wallet server computer;

associate the companion token with the companion application;

transmit the companion token to the IoT device associated with the companion application; and display a confirmation message on the display screen indicating that the companion application has been loaded to the IoT device.

5. The system of claim 4, wherein the memory of the consumer mobile device comprises further instructions, subsequent to the instructions for receiving the user authentication data from the biometric sensor, configured to cause the mobile device processor to:

determine, by the companion application, that the authentication data input by the user is incorrect; and terminate the device token association process.

6. The system of claim 4, wherein the display of the companion application user interface further comprises an option to manually enter payment card credentials.

7. A method for provisioning payment card credentials to an Internet of Things (IoT) device using a companion application, comprising:

receiving, by a mobile device processor of a consumer's mobile device from an input component, an instruction by a user to launch a wallet application;

launching, by the mobile device processor, the wallet application;

displaying, after launching the wallet application by the mobile device processor on a display screen, a wallet application user interface (UI) comprising a list of available companion applications associated with a plurality of merchants and a list of Internet of Things (IoT) devices;

receiving, by the mobile device processor via the input component, selection by the user of a companion application from the wallet application UI;

displaying, in response to the selection of the companion application by the mobile device processor on the display screen, a selection screen comprising an icon identifying the selected companion application and a list of available payment card accounts of the wallet application;

receiving, by the mobile device processor via the input component, a selection of a payment card account by the user from the selection screen;

displaying, by the mobile device processor on the display screen, a prompt for the user to provide user authentication data to a wallet application associated with the selected payment card account via a biometric sensor;

receiving, by the wallet application running on the mobile device processor from the biometric sensor collecting the authentication data from the user, the user authentication data;

authenticating, by the wallet application running on the mobile device processor, the user based on the user authentication data received from the biometric sensor;

transmitting, in response to authentication of the user and to receiving the selection of the payment card account by the mobile device processor to a wallet server computer, payment account credentials of the payment card account;

receiving, by the mobile device processor from the wallet server computer, a companion token representing a digitization of the payment card account;

associating, by the mobile device processor, the companion token with the companion application;

transmitting, by the mobile device processor to the IoT device associated with the companion application, the companion token; and displaying, by the mobile device processor on the display screen, a confirmation message indicating that the companion token has been loaded to the IoT device.

8. The method of claim 7, further comprising, after receiving the user authentication data:

determining, by the mobile device processor, that the user authentication data is incorrect; and terminating, by the mobile device processor, the device token association process.

9. A system for provisioning payment card credentials an Internet of Things (IoT) device using a companion application, comprising:

a consumer mobile device comprising a mobile device processor operably connected to a memory, an input component, at least one biometric sensor and a display screen;

at least one Internet of Things (IoT) device operable for communications with the consumer mobile device;

a wallet server computer operably connected to the consumer mobile device;

an issuer financial institution computer operably connected to the wallet server computer;

a tokenization provider computer operably connected to the issuer FI computer; and a commerce platform computer operably connected to the wallet server computer and to the tokenization provider computer;

wherein the memory of the consumer mobile device comprises instructions configured to cause the mobile device processor to:

receive via the input component, an instruction by a user to launch a wallet application;

launch the wallet application;

display on the display screen after launching the wallet application, a wallet application user interface (UI) comprising a list of available companion applications associated with a plurality of merchants and a list of IoT devices including the at least one IoT device;

receive, via the input component, selection by the user of a companion application from the wallet application UI;

display, in response to the selection of the companion application on the display screen, a selection screen comprising an icon identifying the selected companion application and a list of payment card accounts associated with the wallet application;

receive, via the input component, a selection by the user of a payment card account from the selection screen;

display a prompt on the display screen for the user to provide user authentication data to a wallet application associated with the selected payment card account via the biometric sensor;

receive, by the wallet application from the biometric sensor collecting the authentication data from the user, the user authentication data;

authenticate, by the wallet application, the user based on the user authentication data received from the biometric sensor;

transmit, in response to authentication of the user and to receiving the selection of the payment card account, payment account credentials of the payment card account to the wallet server computer;

associate the companion token with the companion application;

transmit the companion token to the IoT device associated with the companion application; and display a confirmation message on the display screen indicating that the companion token has been loaded to the IoT device.

10. The system of claim 9, wherein the memory of the consumer mobile device comprises further instructions, after the instructions for receiving the user authentication data, configured to cause the mobile device processor to:

determine that the user authentication data input by the user is incorrect; and terminate the device token association process.

* * * * *